(12) United States Patent
Cimmino et al.

(10) Patent No.: US 12,734,968 B2
(45) Date of Patent: Sep. 15, 2026

(54) TELESCOPIC GUIDE SYSTEM FOR SLIDING STEPS

(71) Applicant: Bode—Die Tür GmbH, Kassel (DE)

(72) Inventors: Marco Cimmino, Adelebsen (DE); Christoph Theis, Bad Wildungen (DE)

(73) Assignee: BODE—DIE TÜR GMBH, Kassel (DE)

( * ) Notice: Subject to any disclaimer, the term of this patent is extended or adjusted under 35 U.S.C. 154(b) by 275 days.

(21) Appl. No.: 18/603,911

(22) Filed: Mar. 13, 2024

(65) Prior Publication Data

US 2024/0308428 A1 Sep. 19, 2024

(30) Foreign Application Priority Data

Mar. 15, 2023 (DE) ..................... 20 2023 101 292.2
Mar. 1, 2024 (DE) ..................... 20 2024 101 013.2

(51) Int. Cl.
*B60R 3/02* (2006.01)

(52) U.S. Cl.
CPC ..................................... *B60R 3/02* (2013.01)

(58) Field of Classification Search
CPC ....................................................... B60R 3/02
See application file for complete search history.

(56) References Cited

U.S. PATENT DOCUMENTS 6,905,158 B1 * 6/2005 Bastian .............. B62D 33/0273 296/62
9,505,330 B2 * 11/2016 Hirtenlehner .......... B60N 3/063
2007/0267842 A1 * 11/2007 Seibert ...................... B60R 3/02 280/166
2016/0023608 A1 * 1/2016 Carr .......................... B60R 3/02 280/166
2025/0032330 A1 * 1/2025 Coochesfahani ......... B60R 3/02
2025/0058713 A1 * 2/2025 Hayes ....................... B60R 3/02
2025/0296510 A1 * 9/2025 Demonte .................. B60R 3/02
2026/0001489 A1 * 1/2026 Lausch ..................... B60R 3/02

FOREIGN PATENT DOCUMENTS

DE 202020105492 U1 * 1/2022 ........... B61D 23/025
EP 1034088 B1 6/2006
EP 3950458 A1 2/2022
GB 2499421 A 8/2013
WO 2019017845 A1 1/2019

OTHER PUBLICATIONS

Translation of DE-202020105492-U1 (Year: 2022).*

* cited by examiner

*Primary Examiner* — Katy M Ebner
(74) *Attorney, Agent, or Firm* — CANTOR COLBURN LLP

(57) ABSTRACT

A boarding device includes a shiftably arranged sliding step, a step plate, and a slide-out unit operatively connected to the step plate. The slide out unit is embodied to be variable in length in the slide-out direction of the step plate.

5 Claims, 5 Drawing Sheets

20
34-2
36-2
24
36-1
28-2
A
28-1
34-1

TELESCOPIC GUIDE SYSTEM FOR SLIDING STEPS

CROSS-REFERENCE TO RELATED APPLICATIONS

This application claims the benefit of German patent application no. 20 2023 101 292.2, filed on 15 Mar. 2023, and German patent application no. 20 2024 101 013.2, filed on 1 Mar. 2024, the disclosures of which are incorporated herein by reference in their entirety.

TECHNICAL FIELD

The present disclosure relates to a boarding device for a vehicle, in particular for a rail vehicle, comprising a shiftably arranged step plate assembly, having a step plate and a slide-out unit, which is operatively connected to the step plate.

BACKGROUND

Boarding devices of the above-described or of similar design are used in the case of vehicles of different types, but in particular in the case of vehicles of public passenger transportation. In the present case, a "vehicle" can in particular be understood as a wheel-bound or a rail-bound vehicle. In the present context, wheel-bound vehicles can in particular be transport vehicles for the passenger transport, for example bus vehicles. In the present factual context, rail-bound vehicles can likewise be transport vehicles for the passenger transport, for example streetcars, suburban trains, trains (regional trains, long distance trains), subways, trams, etc. . . . Boarding devices, however, can generally be used in the case of vehicles of any type, in the case of which a height difference or a gap between a platform and a standing surface in the interior of the vehicle has to be overcome when persons board or exit. Such a situation can also occur, for example, when holding a plane at a gate or platform of the gate, respectively, which is why boarding devices can also be used in the case of airplanes.

Boarding devices accordingly serve the purpose of simplifying the entering and exiting into a vehicle of the above-described type. Sliding step means are well-known from the prior art.

Sliding step means are based on that a step plate is moved back and forth between a retracted and an extended position, in particular along a shifting axis extending in the vehicle transverse direction. In the extended position, the step plate provides a standing surface, via which a person can enter the vehicle or exit from the latter. To ensure such a linear shifting of the step plate, the step plate can be guided in a linearly shiftable manner in a vehicle-side housing or a frame by means of a guide. Sliding steps simplify the entering and exiting from a vehicle, in that they bridge a gap, which is present between the vehicle and a platform (e.g., of a train platform edge).

For the most part, sliding steps consist of a guide system comprising four rollers. These rollers are fastened to the slide-out unit and move within a raceway, which is located on the or in a base frame of the boarding device.

A special alternative embodiment type of the guide system is characterized in that only the two rollers in the rear in the slide-out direction are fastened to the slide-out and the front two rollers are firmly positioned on the base frame. The raceway of the front rollers is accordingly located on the slide-out.

In combination with the displacement path and the standing surface dimension, the roller distance between the rollers arranged one behind the other in the slide-out direction in the maximally extended position of the step system defines the installation of the boarding device required on the vehicle. Due to the lever arm ratios, the roller distance furthermore defines the forces acting on the rollers.

The installation space on the vehicles is often limited, however, so that solutions are sought, which require as little installation space as possible, but are sufficiently resilient thereby. In the extended position, a correspondingly small boarding device has to nonetheless be able to absorb the passenger loads.

SUMMARY

The present disclosure is based on the object of providing a boarding device, which requires little installation space, but by means of which a safe boarding of persons is safely ensured.

To solve this object, a boarding device with the features of the independent claim is proposed.

According to this, the boarding device has a shiftably arranged sliding step, having a step plate and a slide-out unit operatively connected to the step plate, wherein the slide-out unit is embodied to be variable in length in the slide-out direction of the step plate.

According to this, the slide-out device comprises a front first linear element and a rear second linear element, which can be moved relative to one another in the slide-out direction. Slide-out devices, which jointly hold and move the sliding step, are preferably provided on both sides of the sliding step.

The relative movability of the two linear elements to one another can be attained by means of different connections. For example, the linear elements can be formed as telescopic rods, which are guided within one another entirely or in some regions.

In a particularly preferred embodiment variation, the linear elements are formed by two components, which are essentially arranged next to one another. One of the linear elements has at least one elongated hole, in which a guide roller mounted on the other linear element is mounted in a displaceable manner. Instead of a single elongated hole, two elongated holes, into which a guide roller protrudes in each case and is guided therein, can preferably also be arranged one behind the other in the slide-out direction. The longitudinal axes of the elongated holes extend in the slide-out direction. The two linear elements can be displaced relative to one another over the distance of the longitudinal extension of the elongated holes.

The slide-out unit is thus formed from two linear elements in the slide-out direction, which are connected to one another via a linear element connection and which are arranged essentially next to one another. In the above-described exemplary embodiment, the linear element connection of the two linear elements is formed by the at least one elongated hole and the guide roller, which is displaceably mounted therein.

One of the linear elements is mounted on a roller, which is arranged in a stationary manner on the vehicle, in particular on a base frame, and can be displaced thereon. A second roller is arranged on this linear element itself and rolls in or on a guideway of the boarding device.

In a preferred exemplary embodiment, the stationary roller is located in the front in the slide-out direction and the roller arranged on the linear element itself is located in the rear in the slide-out direction, preferably on the free end of the linear element.

Due to the possible relative movement to one another, the two rollers can be arranged at a different distance from one another in the slide-out direction, wherein the relative shifting is determined by the length of the elongated hole. This results in a relative movement distance between the two linear elements. The distance can thus be enlarged in particular in the extended state. This is attained by shifting the linear element, which carries the rear roller.

In the retracted state, the respective rear rollers are in space-saving position, in which the guide rollers are arranged in the elongated holes in the front in the slide-out direction. In the extended state, those linear elements, which carry the guide rollers, preferably perform a relative movement to the other linear elements, whereby the rear rollers obtain an enlarged distance from the front rollers. Due to a limitation of the displacement path of the rear roller, the relative movement is caused during the extension. A minimal distance of the rear, movable roller to the front, firmly positioned roller, is ensured thereby.

The maximum distance between the rollers in the extended state of the sliding step is directly relevant for the maximum possible load of the sliding step. Due to limited permissible maximum roller forces, it is advantageous to be able to enlarge the roller distance in the extended state.

It has turned out that a relative movement distance between the two linear elements to one another in the slide-out direction of approximately 15% to 40%, preferably of approximately 20% to 25%, of a total distance of the stationary roller from the second roller in the retracted state of the step plate is sufficient to ensure an installation space reduction with stable or sufficient resilience, respectively, of the sliding step.

BRIEF DESCRIPTION OF THE DRAWINGS

The following figures show a preferred embodiment variation of the disclosure. This embodiment variation is to only be understood in an exemplary manner. The figures serve the purpose of clarifying the disclosure in general, it goes without saying that modifications and detail solutions are possible, in which.

DETAILED DESCRIPTION OF THE DRAWINGS

Figure 1:
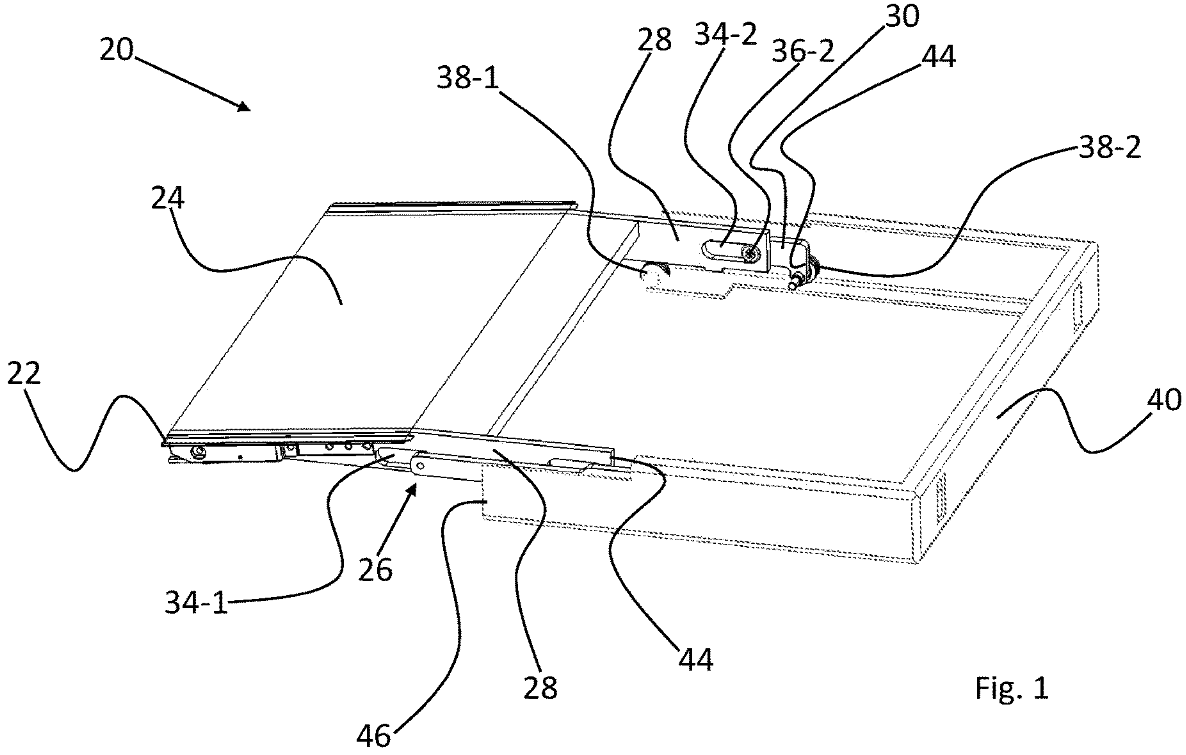
FIG. 1: shows a boarding device according to the disclosure in perspective illustration.

FIG. 1 shows the essential components and elements of a boarding device 20 according to the disclosure in perspective illustration, components and elements, which are not necessary for understanding the disclosure, are not shown.

Shiftably arranged sliding step 22 comprising a step plate 24, which can be extended and retracted via an operatively connected slide-out unit 26, can be seen.

It is essential for the disclosure that the slide-out unit 26 is embodied in a longitudinally variable manner in the slide-out direction of the step plate 24. The slide-out direction is illustrated by the arrow. In the shown exemplary embodiment, the longitudinal variability is effected by a front first linear element 28 and a rear second linear element 30 in the slide-out direction, which are connected to one another via a linear element connection 32. The two linear elements 28, 30 are and essentially arranged next to one another, thus shift parallel to one another. It goes without saying that the longitudinal variability is also at hand in the direction opposite to the slide-out direction, thus quasi the negative slide-out direction, thus in the direction of movement of the step plate 24.

Figure 2:
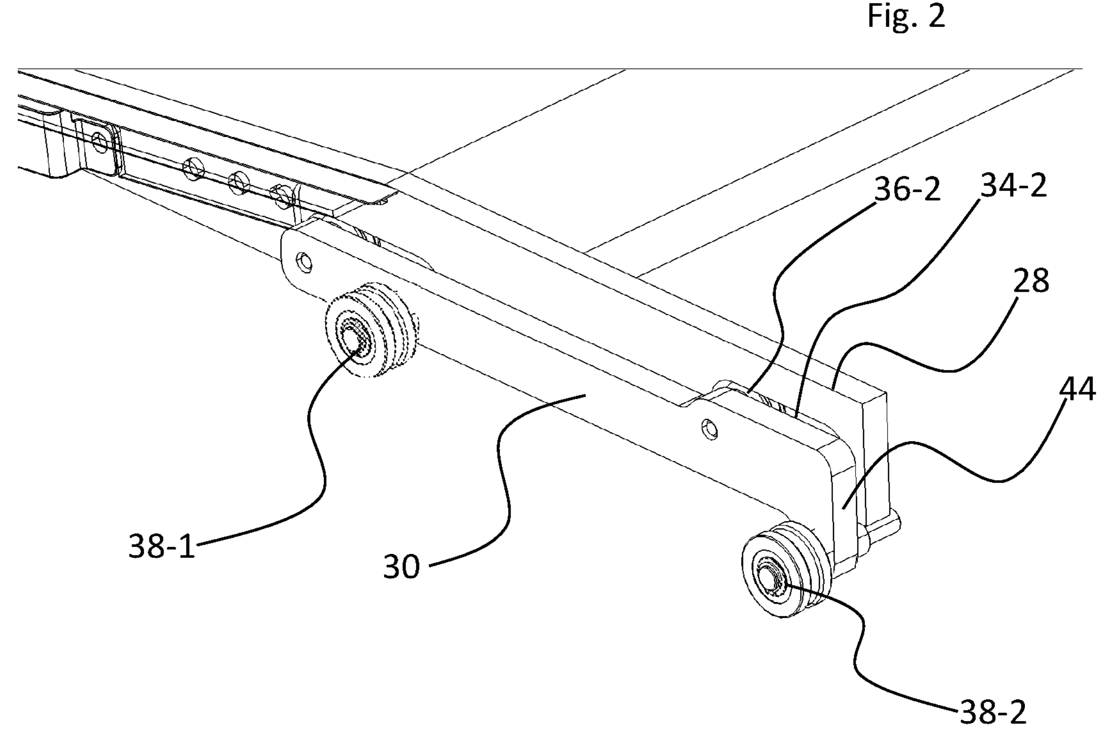
FIG. 2: shows an enlarged sectional illustration of cropped linear elements from FIG. 1, FIG. 3: shows a cropped side view of the boarding device from FIG. 1, in the retracted state of the sliding step.

In the shown exemplary embodiment, slide-out units 26 comprising linear elements 28, 30 are arranged on both sides of the step plate 24. A slide-out unit 26 is illustrated in an enlarged manner in FIG. 2.

The linear element connection 32 of the two linear elements 28, 30 is formed by an elongated hole 34 and a guide roller 36, which is displaceably mounted therein, wherein the elongated hole 34 is arranged in one of the two linear elements 28, 30, and the guide roller 36 is arranged on the other linear element 28, 30. A longitudinal axis of the elongated hole 34 extends along the slide-out direction.

Two linear element connections 34 arranged one behind the other in the slide-out direction are shown, wherein the two elongated holes 34 are arranged in the front first linear element 28 as a front elongated hole 34-1 and a rear elongated hole 34-2. A front guide roller 36-1 rotatably mounted on the rear linear element 30 extends into the front elongated hole 34-1 and a rear guide roller 36-2 likewise arranged on the rear linear element 30 extends into the rear elongated hole 34-2.

The rear second linear element 30 is mounted on a first roller 38-1, which is arranged in a stationary manner on the vehicle and can be displaced thereon. The first roller 38-1 arranged in a stationary manner is arranged on a base frame 40, into which the step plate 24 can be retracted and extended. A second roller 38-2 is arranged on the second rear linear element 30 itself and rolls on a guideway 42, which is arranged on the boarding device 20 or on the base frame 40, respectively, and extends in the slide-out direction. The second roller 38-2 is arranged on a free rear end 44 of the second rear linear element 30 in the slide-out direction, and the first roller 38-1 arranged in a stationary manner is arranged on a free front end 46 of the base frame 40 in the slide-out direction.

Figure 3:
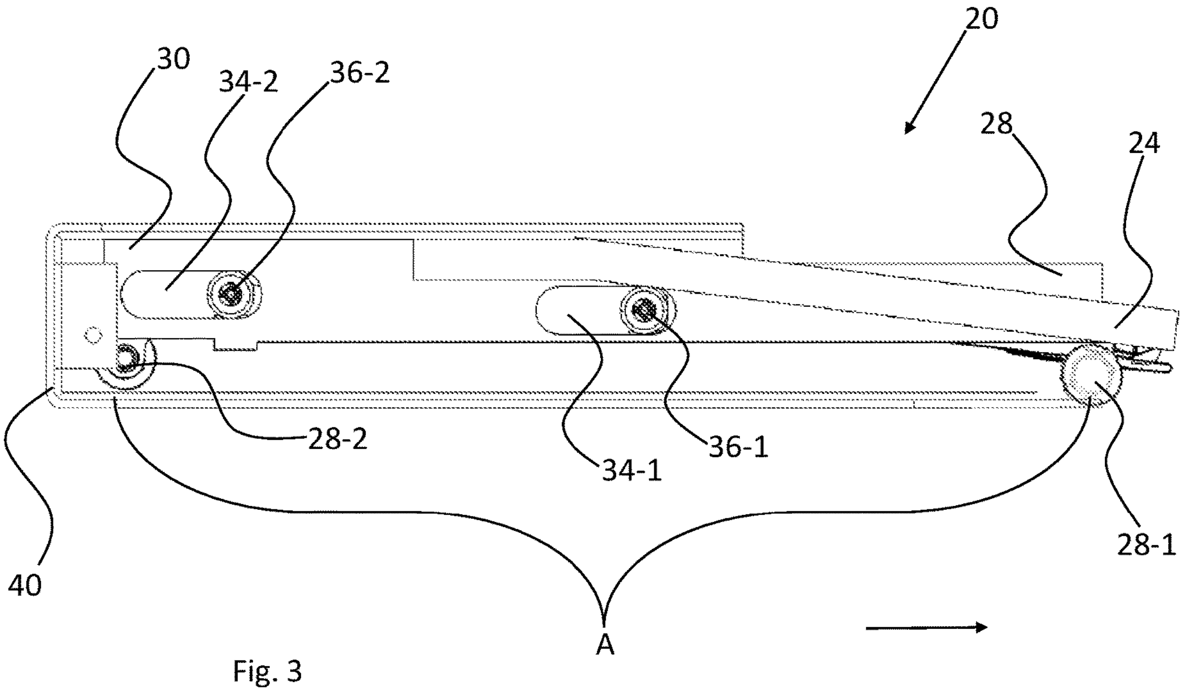
Figure 4:
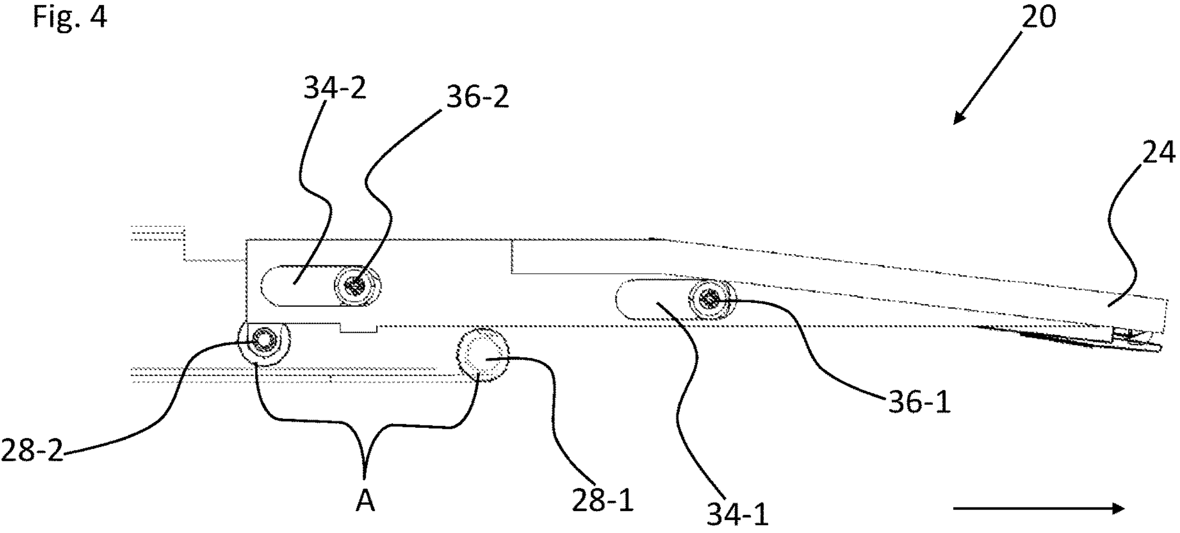
FIG. 4: shows a cropped side view of the boarding device from FIG. 1, in the extended state of the sliding step and small roller distance.
Figure 5:
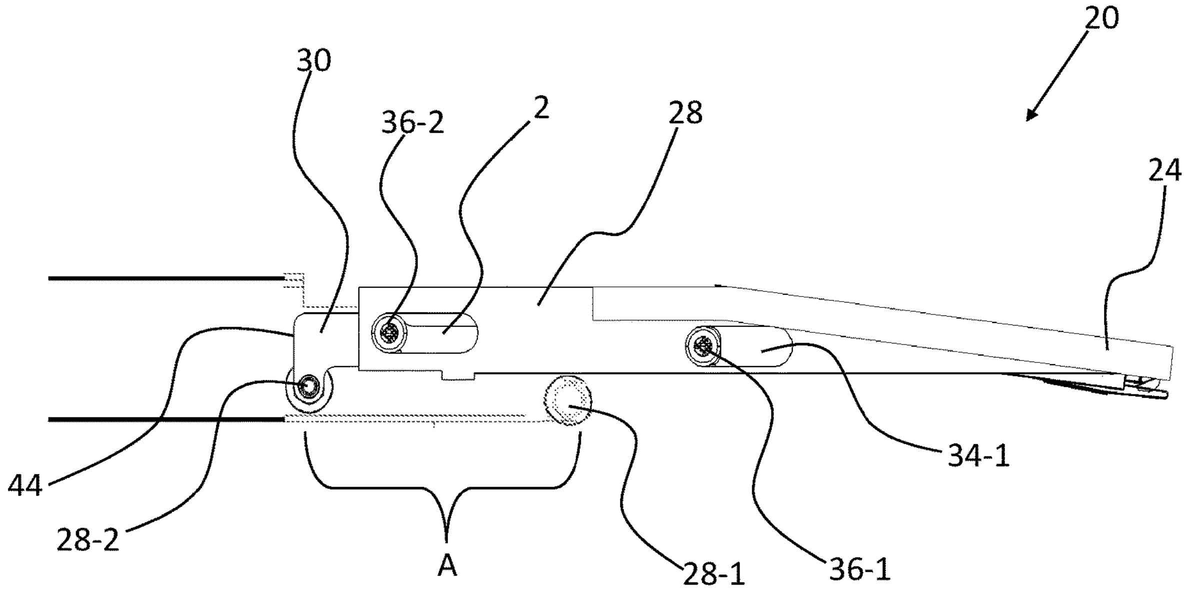
FIG. 5: shows a cropped side view of the boarding device from FIG. 1, in the extended state of the sliding step and enlarged roller distance.

The FIGS. 3 to 5 clarify the effect of the longitudinal variability during the movement of the sliding step 22 or step plate 24, respectively. The sliding step 22 or the step plate 24, respectively, is shown in positions, which are extended at different distances, in FIG. 3 in the retracted state of the sliding step 22, in the FIGS. 4 and 5 in the extended state. The linear elements 28, 30 are illustrated in a cropped manner, side walls of the housing frame 40 are removed. The FIGS. 3 to 5 show the different relative positions of the guide rollers 36 and elongated holes 34 to one another. In FIG. 4, the roller distance between the first roller 38-1 arranged in a stationary manner on the base frame 40 and the second roller 38-2 arranged on the second rear linear element 30 itself is smaller than in the situation illustrated in FIG. 5.

The disclosure is thus based essentially on the knowledge of being able to vary the distance of the rollers 38 in different position of the sliding step 22. This can be made possible by means of the shown embodiment variation, but other options, which provide for a relative shifting between linear elements 28, 30 connected to the sliding step, are also conceivable.

The invention claimed is:

1. A boarding device comprising a shiftably arranged sliding step, having a step plate and a slide-out unit operatively connected to the step plate, wherein the slide-out unit is embodied to be variable in length in the slide-out direction of the step plate, wherein the slide-out device comprises a front first linear element in the slide-out direction and of a rear second linear element in the slide-out direction, wherein the two linear elements are connected to one another via a linear element connection and are arranged essentially next to one another, wherein the linear element connection of the two linear elements to one another is formed by at least one elongated hole and a guide roller displaceably mounted therein, wherein the elongated hole is arranged in one of the linear elements and the guide roller is arranged on the other linear element and a longitudinal axis of the elongated hole extends in the slide-out direction, wherein one of the linear elements is mounted on a first roller arranged on the vehicle in a stationary manner and is configured to be displaced thereon, wherein a second roller is arranged on the linear element itself and rolls on a guideway, which is arranged on the boarding device and which extends in the slide-out direction, wherein the first roller arranged in a stationary manner is arranged on a base frame, into which the step plate is configured to be retracted and extended, wherein the slide-out unit is arranged such that a roller spacing A between the first roller and the second roller is configured to be increased by displacing the rear second linear element, which supports the second roller, in the extension direction.

2. The boarding device according to claim 1, wherein the second roller is arranged on a free rear end of the linear element in the slide-out direction and the first roller arranged in a stationary manner is arranged on a free front end of the base frame in the slide-out direction.

3. The boarding device according to claim 1, wherein the slide-out unit has two linear element connections arranged one behind the other in the slide-out direction.

4. The boarding device according to claim 1, wherein a respective slide-out unit is provided on both sides of the step plate.

5. The boarding device according to claim 1, wherein a relative movement distance between the two linear elements in the slide-out direction to one another is approximately 15% to 40% of a total distance from the stationary first roller to the second roller in the retracted state of the step plate.

* * * * *